United States Patent
Naber et al.

(10) Patent No.: US 9,566,897 B2
(45) Date of Patent: Feb. 14, 2017

(54) PROCEDURE FOR THE OPERATION OF A LIGHTING SYSTEM

(71) Applicant: Hella KGaA Hueck & Co., Lippstadt (DE)

(72) Inventors: Michael Naber, Ahlen (DE); Carsten Wilks, Lippstadt (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 0 days.

(21) Appl. No.: 14/423,031

(22) PCT Filed: Aug. 14, 2013

(86) PCT No.: PCT/EP2013/066956
§ 371 (c)(1),
(2) Date: Feb. 20, 2015

(87) PCT Pub. No.: WO2014/032969
PCT Pub. Date: Mar. 6, 2014

(65) Prior Publication Data
US 2015/0210205 A1    Jul. 30, 2015

(30) Foreign Application Priority Data
Aug. 29, 2012   (DE) .................. 10 2012 107 946

(51) Int. Cl.
B60Q 1/14   (2006.01)
B60Q 1/08   (2006.01)
B60Q 11/00  (2006.01)
B60Q 1/04   (2006.01)

(52) U.S. Cl.
CPC ............. *B60Q 1/04* (2013.01); *B60Q 1/143* (2013.01); *B60Q 11/00* (2013.01); *B60Q 2300/056* (2013.01); *B60Q 2300/146* (2013.01)

(58) Field of Classification Search
CPC .............. B60Q 1/04; B60Q 1/08; B60Q 11/00
USPC ............... 315/82; 340/937; 362/465, 466
See application file for complete search history.

(56) References Cited

U.S. PATENT DOCUMENTS

| | | | |
|---|---|---|---|
| 2006/0139938 A1 | 6/2006 | Hayami | |
| 2013/0258688 A1* | 10/2013 | Kalapodas | B60Q 1/085 362/465 |
| 2014/0175978 A1* | 6/2014 | Kobayashi | B60Q 1/1423 315/82 |

FOREIGN PATENT DOCUMENTS

| | | |
|---|---|---|
| DE | 4120893 A1 | 1/1993 |
| DE | 4430279 A1 | 2/1996 |
| DE | 10042615 A1 | 4/2001 |
| DE | 602004001593 T2 | 7/2007 |
| DE | 102007028658 A1 | 12/2008 |
| DE | 202011103805 U1 | 1/2012 |
| EP | 1442928 A1 | 8/2004 |
| EP | 2261556 A1 | 12/2010 |

(Continued)

*Primary Examiner* — Daniel D Chang
(74) *Attorney, Agent, or Firm* — Husch Blackwell LLP

(57) ABSTRACT

A procedure for the operation of a lighting system (10) in order to produce a first and a second light function with a separate light module (20, 30) respectively, wherein at least the second light function features an adjustable illumination range (120), with the following steps:
  Detection of an error in the adjustable illumination range (120) of the second light function,
  Deactivation of the second light module (30) of the second light function,
  Continued operation of the light module (20) of the first light function.

9 Claims, 2 Drawing Sheets

(56) References Cited

FOREIGN PATENT DOCUMENTS

FR 2878797 A1 6/2006

\* cited by examiner

PROCEDURE FOR THE OPERATION OF A LIGHTING SYSTEM

CROSS REFERENCE

This application claims priority to PCT/EP2013/066956, filed Aug. 29, 2013, which itself claims priority to German Application No. 10 2012 107946.3, filed Aug. 29, 2012, which are both hereby incorporated by reference.

FIELD OF TECHNOLOGY

The present invention relates to a procedure for the operation of a lighting system in order to produce a first and a second light function as well as a lighting system of a motor vehicle in order to produce a first and a second light function.

BACKGROUND

Procedures for the operation of lighting systems and corresponding lighting systems for producing a first and a second light function are well-known. They are used e.g. in motor vehicles in order to provide a low-beam light as a first light function and a high-beam light as second light function by means of head lights. In these well-known procedures and lighting systems, there is a provision for switching between low-beam and high-beam light. It is also well-known, that the high-beam light presents a selective high-beam light, in particular a regulated high-beam light. This refers to a use of the high-beam light, even if approaching traffic is appearing in front of the motor vehicle. With a selective or regulated high-beam light, a selective and thus a particular prevention of the glare of the approaching traffic can be accomplished. In the well-known lighting systems it is thus possible, that the illumination is performed around the approaching traffic in the manner of a high-beam light, but without producing a glare to the approaching traffic. This leads to an improved illumination in front of the motor vehicle.

Yet, the disadvantage of such known procedures for lighting systems and of such-like lighting systems is, that there is a danger of producing a glare to the approaching traffic when the control of the high-beam light fails, in particular when the selective high-beam light fails. If e.g. a mechanically operated aperture is used to avoid producing a glace to the approaching traffic, it can happen, that this mechanism is stuck or that a precise positioning of the aperture is not possible. This results in the danger of producing a glare to the approaching traffic. This is to be avoided in order to reduce the risk of producing a glare to the approaching traffic on the roads. Thus, it is necessary to deactivate the entire light module when such an error occurs in a common lighting system and in a well-known procedure for controlling such lighting systems, wherein both light functions, which includes the high-beam light as well as the low-beam light are turned off. The corresponding headlight is thus turned off, so that the low-beam light, which actually would not add to the glare to the approaching traffic, is weakened as well when one of the two headlights and the corresponding light module is deactivated. So, in the case of an error of a selective high-beam light, the illumination is reduced more than what would actually be necessary,

SUMMARY OF THE INVENTION

It is the objective of the present invention, to at least partially solve these previously described disadvantages. The objective of the present invention in particular is to present a cost-effective and simple procedure for the operation of a lighting system as well as for a lighting system in a motor vehicle for producing a first and a second light function, which can still provide sufficient illumination in front of the motor vehicle, even in the case of an error in the second light function.

Characteristics and details, which are described in connection with the procedure according to the invention, apply of course also in connection with the lighting system according to the invention and vice versa, so that with reference to the disclosure of the individual aspects of the invention, it is referred to, or can be referred to, both reciprocally.

A procedure according to the invention serves for the operation of a lighting system in order to produce a first and a second light function with a separate light module, respectively. At least the second light function is herein supplied with an adjustable illumination range. A procedure according to the invention is made up of the following steps:

Detection of an error in the adjustable illumination range of the second light function, Deactivation of the second light module of the second light function, Continued operation of the light module of the first light function.

A lighting system for a procedure according to the invention serves for the production of a first and a second light function. This can be e.g. a low-beam light as a first light function and a high-beam light as a second light function of a motor vehicle. The second light function, which would be in particular the high-beam light of the motor vehicle, features an adjustable illumination range. The illumination range refers to the area in front of the motor vehicle, which is illuminated by means of the respective light module of the light function. The illumination range of the high-beam light, and thus of the second light function, is adjustable in the sense of the present invention. It can be adapted to the present conditions of the surrounding area of the motor vehicle. It is hereby referred to e.g. a situation, in which traffic is approaching the motor vehicle while the high-beam light is activated. In common high-beam lighting systems, the high-beam light had to be turned off completely in such a situation. But if the second light function is equipped with an adjustable illumination range, this adjusting of the illumination range can selectively prevent a glare to the approaching traffic. Thus, the entire illumination situation in front of the motor vehicle is improved, with only a minor restriction of the illuminated area.

In the case of an error in the selectively adjustable illumination of the illumination range of the second light function, the individual light module, and thus the entire headlight of the motor vehicle is no longer deactivated according to the invention and in contrast to known procedures. Rather, since there is a separation in two light modules which are assigned to one of the two respective light functions, it is possible to continue to operate the light module of the first light function. In other words, it is possible that the respective headlight which produces a defective high-beam light and thus a defective second light function, can further be used to at least continue to produce the low-beam light or the first light function. Compared to know procedures, this improves the illumination situation in front of the motor vehicle, since there won't be a blind spot on the respective side of the head light of the motor vehicle due to a complete shutdown of the head light. This procedure is used in particular in lighting systems, which consist of a separate light module for each one of the two light functions.

In the sense of the present invention, the term light module is to be understood as a module, which can provide the respective illumination range of the light function. Thus, each light module consists of at least one light source and corresponding optical elements by means of which the light that is emitted from the light sources can be brought into the desired illumination range. The optical elements can be e.g. apertures, reflectors or lenses. It is also possible to use light guiding elements or so-called TIR-elements (Total Internal Reflection) in line with the present invention. Among other things, LEDs can be used as light sources, which work very cost-effective and efficient. But it is of course also possible that other lamps are used for the light modules, such as e.g. halogen- or xenon lamps. Laser systems can also be used as light sources in line with the present invention.

The adjustment of the illumination range can be accomplished in a mechanical manner, as well as in a control technological manner. For a mechanical adjustment, it is possible to e.g. design actuators, by means of which a portion of the second light function can be shielded off with a movable or rotatable aperture, and thus, a glare-free section for the approaching traffic within the associated illumination range can be achieved. Alternatively or additionally it is possible to selectively deactivate a portion of the illuminants within a matrix-like arrangement of a plurality of illuminants by means of some control technology, so that a blind spot can be produced as a glare-free section for the approaching traffic. An error with regard to the mechanical arrangement of the adjustability can e.g. be the loss of the position detection of such an aperture. Another possible error would be if the mechanism would get stuck. With regards to an embodiment with some form of control technology and e.g. a matrix-like arrangement of illuminants, a possible error would be e.g. the failure of the control technology of the respective light module. In both cases, it could no longer be guaranteed that the glare-free section can be brought in congruence with the approaching traffic. In such a case, the second light module will be totally deactivated and only the first light module continues to be operated, so that despite the illumination in front of the motor vehicle, a glare to the approaching traffic is effectively prevented even in case of an error.

A procedure according to the invention could be further developed in the sense, that the detection of an error could be performed at least partially by means of a, particularly passive, monitoring of the changes in the illumination range of the second light function. This could be accomplished e.g. by means of a monitoring electronics, which performs a feedback of the control of the respective actuators or of the respective operation of the adjustment for the illumination range. It is thus possible, that e.g. a feedback is performed by position detection sensors regarding the positioning of the actuator mechanism of the respective second light module. It is also possible that control sensors monitor to which extend the control of a matrix-like arrangement of a plurality of illuminants functions in a desired manner. In this way, an internal, or so-to-say a passive, feedback of the monitoring of the changes in the illumination range is made possible, so that the illumination range in front of the motor vehicle does not have to be monitored directly. Thus, this embodiment can be realized in a particularly cost-effective and simple way.

Further, it is also possible that the detection of the error in the procedure according to the invention is performed at least partially by means of a, particularly active, monitoring of the illumination range, which is produced by the second light function. This can be achieved e.g. by means of camera systems. An active monitoring is understood to be a wide control loop, in which the illumination range in front of the motor vehicle is monitored. A feedback within the procedure, or within the calculation unit for controlling an actuator mechanism or a matrix-like arrangement of illuminants is no longer absolutely necessary. A big advantage of this embodiment is the increased security, since the actual situation on the road in front of the motor vehicle is monitored in order to detect an error.

It is further advantageous in the procedure according to the invention, if the continued operation of the light module of the first light function is performed with an intensified light output. In case of an error, the respective light module of the second light function, or the high-beam light, is deactivated despite a high-beam demand from the driver of the motor vehicle. In order to compensate the reduction of the light intensity in this portion of the illumination range in front of the motor vehicle, or in the range of the left or right head light of the motor vehicle, without producing a glare to the approaching traffic, it is possible to increase the light intensity of the first light module, which continues to be operated. In this way, the illuminated range, which does not pose a glare to the approaching traffic, is supplied with an increased light intensity. Thus, the brightness is increased, so that at least a partial compensation regarding the light intensity of the now deactivated second light module can be performed by means of the illumination of this portion of the illumination range in front of the motor vehicle.

In line with the present invention, the light module for producing the first light function is in particular the first light module and the light module for producing the second light function is in particular the second light module.

A further object of the present invention is a lighting system of a motor vehicle for producing a first and a second light function. Hereby, at least the second light function features an adjusted illumination range. A lighting system according to the invention is characterized in that at least one first light module is designed for producing the first light function and at least one second light module is designed for producing the second light function. In the case of an error in the adjusted illumination range of the second light function, the second light module is deactivated and the first light module continues to be operated. In this way, a lighting system according to the invention refers to a procedure according to the invention. It encompasses the same advantages as they were extensively described with regard to the procedure according to the invention. The first and the second light function provide in particular a low-beam light as the first light function and a high-beam light as the second light function of a motor vehicle. The separation of the two light modules is to be understood with regard to a separate regulation, a separate control and a separate adjustment of the emitted light direction.

A lighting system according to the invention can be further developed in that a calculation unit is intended, which is designed to perform of the procedure according to the invention. Thus, such a lighting system encompasses the same advantages as they were extensively described with regard to the procedure according to the invention.

A lighting system according to the invention can be further developed, so that the second light module consists of an actuator mechanism in order to adjust the illumination range of the second light function. Such an actuator mechanism can e.g. be an aperture, which can be adjusted into different positions by means of rotation or moving. In this way it is possible, that the aperture can shield off a portion of the emitted light of this light module, so that a glare-free section, which does not produce a glare to the approaching traffic, can be provided within the respective illumination range of the second light function. The actuator mechanism can consist of a set of levers and/or electric rotary motors. In addition or as an alternative to apertures, it is also possible to use mirrors, reflectors and/or lenses.

It is also advantageous, if the second light module in the lighting system according to the invention features a plurality of illuminants, which are arranged towards each other in a matrix-like way, in order to adjust the illumination range of the second light function. This refers to an alternative or combinable possibility that can be used to adjust the illumination range of the second light function. A basically matrix-like arrangement of a plurality of light sources has the effect, that individual light sources can be deactivated, so that a glare-free section can be produced within the matrix field illumination by means of a deliberate and selective deactivation of individual light sources. The control technology for this matrix is crucial, so that such glare-free sections can be provided in a faultless manner. In case this control technology does have errors, it is possible that a procedure according to the invention in a lighting system according to the invention can prevent an undesired glare to the approaching traffic by means of deactivating the second light module.

It is also advantageous, if the light modules in the light system according to the invention consist of light sources with illuminants in the form of LEDs. These are particularly cost-effective and easy to use, so that an embodiment of such a light system according to the invention can also be produced in a particularly cost-effective and simple way.

Moreover, it can be advantageous if there is at least one control unit in the lighting system according to the invention in order to detect an error in the adjusted illumination range of the second light function. This could be accomplished in an active manner, e.g. by means of a camera system which monitors the illumination range of the second light function. An internal, passive feedback is also possible, so that the control unit monitors the regulation of the adjustment of the illumination range. Thus, it is possible that e.g. position sensors of the actuator mechanism are checked or that there is a monitoring of the respective control sensors for a matrix-like arrangement of a plurality of light sources.

A lighting system according to the invention is explained in more detail by means of the attached figures. The terms "left," "right," "above," and "below," which are used herein, refer to an alignment of the figures with normal readable reference signs.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
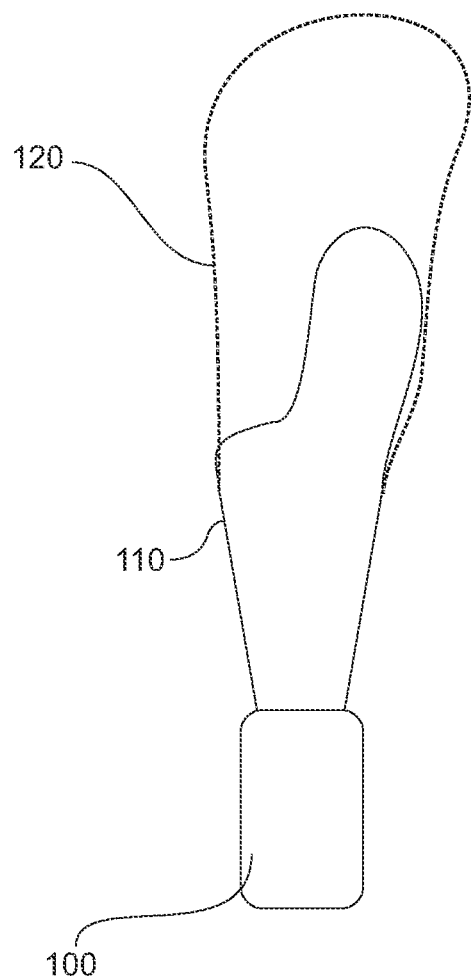
FIG. 1 is top view a schematic depiction of different illumination ranges in the front of the motor vehicle.

In FIG. 1, a motor vehicle 100 is depicted in top view. It features headlights (not depicted in detail) in the front of the motor vehicle 100 which is facing upwards, the headlights being arranged on the left and on the right of the motor vehicle 100. Together, they produce two illumination ranges 110 and 120. Each one of these headlights is designed as lighting system 10, as they are e.g. depicted in the FIGS. 2 and 3. Thus, two illumination ranges 110 and 120 are separately provided as a first illumination range 110 and as a second illumination range 120 by means of the lighting systems 10.

The first illumination range 110 of the first light function depicts a low-beam light function of the motor vehicle 100 in a schematic way. The second illumination range 120 depicts a high-beam light function of the motor vehicle 100 for the second light function in a schematic way. The high-beam light function of the second illumination range 120 is selectively deactivated, so that this high-beam light does not cause any glare to the approaching traffic coming from above in FIG. 1 towards motor vehicle 100, since it is possible to selectively prevent a glare to the approaching vehicle. In order to accomplish this, actuator mechanism systems as well as matrix-like arrangements of a plurality of light sources 24 and 34 are possible in line with the present invention.

Figure 2:
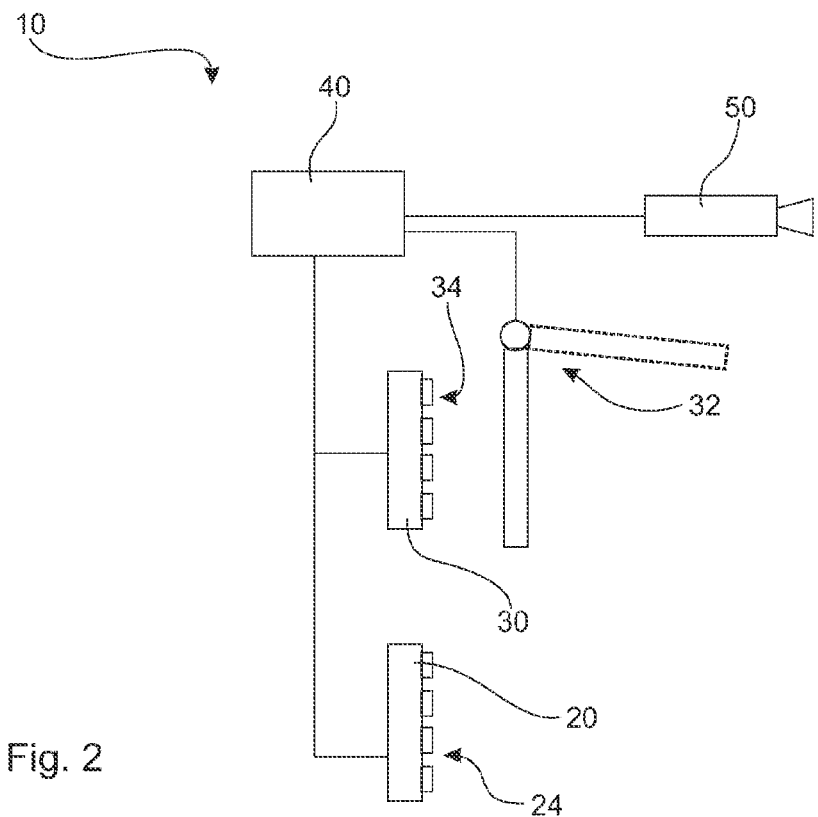
FIG. 2 is a schematic depiction of a first embodiment of a lighting system according to the invention and FIG. 3 is a schematic depiction of a further embodiment of a lighting system according to the invention.

FIG. 2 depicts an embodiment of lighting system 10 according to the invention in a schematic way. It is equipped with a first light module 20 and with a second light module 30. The first light module 20 features a plurality of light sources 24 in the form of LEDs and is connected to a common calculation unit 40. This first light module 20 has the purpose of providing the first light function and thus the low-beam light, as it is depicted by the illumination range 110 in FIG. 1.

Further to be seen in FIG. 2 is a second light module 30 with a plurality of light sources 34, which are designed as LEDs in this embodiment. This second light module 30 has the purpose to provide the second illumination range 120 and thus a high-beam light function as second light function. The second light module 30 is also connected to the calculation unit 40 in a signal communicating manner.

As it can be further derived from FIG. 2, an actuator mechanism 32 is intended, which is arranged in the form of a rotatable aperture. The opened aperture is depicted with a dotted line and the closed aperture is depicted with a straight line. This actuator mechanism 32 is also connected to the calculation unit 40 in a signal communicating manner. In the case of an error, or when it cannot be determined in which position the aperture of the actuator mechanism 32 can be moved, there is a danger of producing a glare to the approaching traffic, when the high-beam light function for the illumination range 120 is activated. In such a case, a procedure according to the invention is performed in the calculation unit 40 and the second light module 30 is deactivated, while the first light module 20 continues to be operated.

FIG. 2 further depicts a version in which the second illumination range 120 is directly, in particular actively, monitored by means of a control unit 50, e.g. in form of a camera system. Thus, the direct effect of an error in front of the motor vehicle 100 can be detected by means of this control unit 50 and it can then be transmitted to the calculation unit 40 in order to perform a procedure according to the invention.

Figure 3:
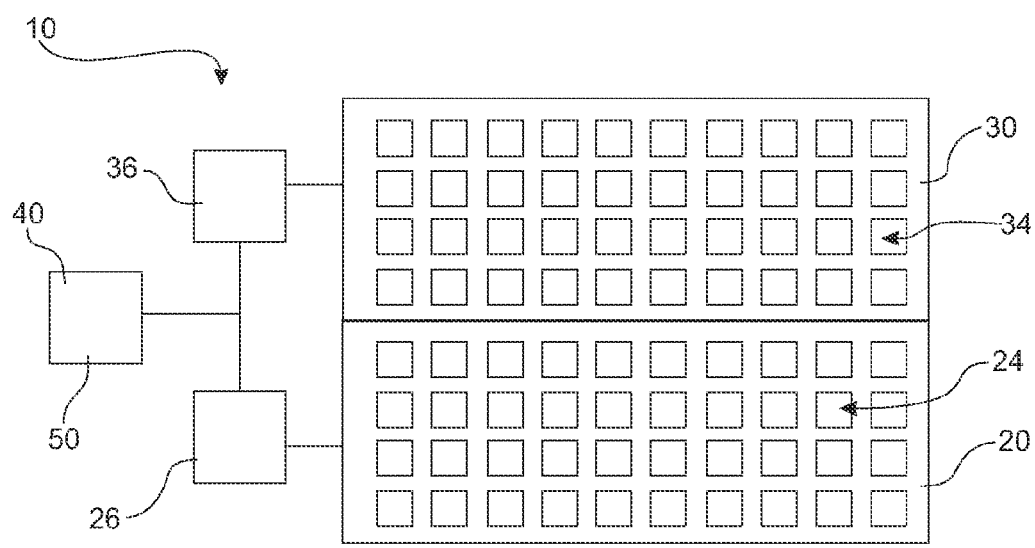

FIG. 3 depicts a further embodiment of a lighting system according to the invention, in which the two light modules 20 and 30 are arranged on top of each other. Each one of these two light modules 20 and 30 features a plurality of light sources 24 and 34 in the form of LEDs that are arranged in a matrix-like way. For each one of the two light modules 20 and 30, a separate control device 26 and 36 is intended respectively. The control device 36 of the second light module 30 in particular has the purpose to deactivate portions of the plurality of light sources 34 in order to produce a small, selective glare-free section for an approaching motor vehicle within the high-beam light function as second light function. If an error should now occur e.g. in the control sensors of the control device 36 of the second light module 30, this error can be detected by a control unit 50, which is arranged within the calculation unit 40 of this embodiment. The detection of this error leads to the performance of the procedure according to the invention within the calculation unit 40, so that the second light module 30 is deactivated, while the first light module 20 continues to be operated.

The previous explanation of the embodiments describe the present invention exclusively by means of examples. It is of course possible that individual characteristics of the present invention can be freely combined with each other, if they are technically advantageous, without leaving the framework of the present invention.

LIST OF REFERENCE SIGNS

10 Lighting system
20 First light module
24 Light source
26 Control device of first light module
30 Second light module
32 Actuator mechanism
34 Light source
36 Control device of second light module
40 Calculation unit
50 Control unit
100 Motor vehicle
110 First illumination range
120 Second illumination range

The invention claimed is:

1. A method for the operation of a lighting system in order to produce a first and a second light function with a separate light module respectively, wherein at least the second light function features an adjustable illumination range, said method comprising the steps of:
    transmitting information regarding a status of the second light function from a sensor to a calculation unit,
    detecting, by the calculation unit, an error in the adjustable illumination range of the second light function,
    transmitting an instruction from the calculation unit to the second light module to deactivate the second light module of the second light function, and
    transmitting an instruction from the calculation unit to the first light module to begin or continue operation of the light module of the first light function.

2. The method according to claim 1, wherein the detection of the error is performed at least partially by means of passive monitoring of the changes of the illumination range of the second light function.

3. The method of claim 1, wherein the detection of the error is performed at least partially by means of active monitoring of the illumination range which is produced by the second light function.

4. The method of claim 1, wherein the continued operation of the light module of the first light function is performed with an intensified light output.

5. A lighting system of a motor vehicle for producing a first and a second light function, wherein at least the second light function features an adjustable illumination range, said lighting system including:
    at least one first light module including a sensor for monitoring the at least one first light module, the at least one first light module designed for producing the first light function,
    at least one second light module including a sensor for monitoring the at least one second light module, the at least one second light module designed for producing the second light function, and
    a calculation unit in communication with each of the at least one first light module and the at least one second light module,
    whereby the sensor of the at least one second light module transmits information regarding a status of the second light function to the calculation unit,
    the calculation unit detects an error in the adjustable illumination range of the second light function,
    the calculation unit transmits an instruction to the second light module to deactivate, and
    the calculation unit instructs the first light module to continue its operation.

6. The lighting system according to claim 5 wherein that the second light module consists of an actuator mechanism, in order to adjust the illumination range of the second light function.

7. The lighting system according to claim 5 wherein the second light module consists of a plurality of light sources, which are arranged towards each other in a matrix-like way, in order to adjust the illumination range of the second light function.

8. The lighting system according to claim 5 wherein the light modules consist of light sources with illuminants in the form of LEDs.

9. The lighting system according to claim 5 wherein at least one control unit is intended in order to detect errors in the adjustable illumination range of the second light function.

* * * * *